Dec. 12, 1944.   H. BOEDDINGHAUS   2,364,616
BONDING SHEET MATERIAL
Filed July 30, 1940   5 Sheets-Sheet 1
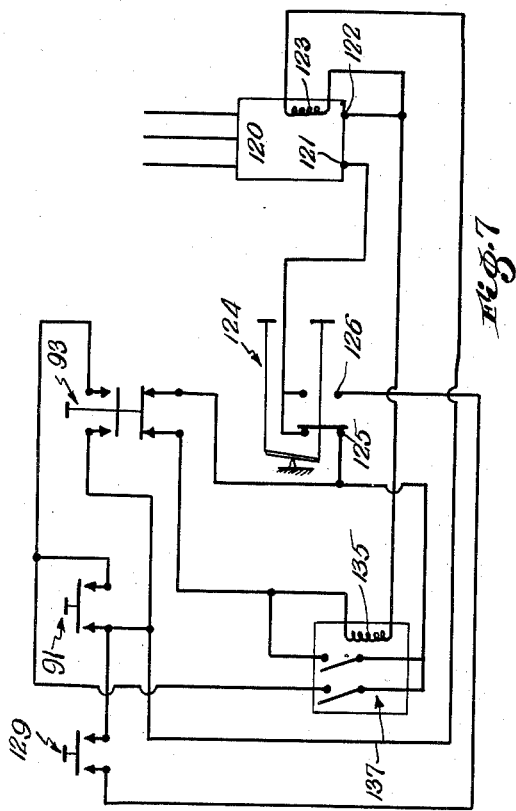
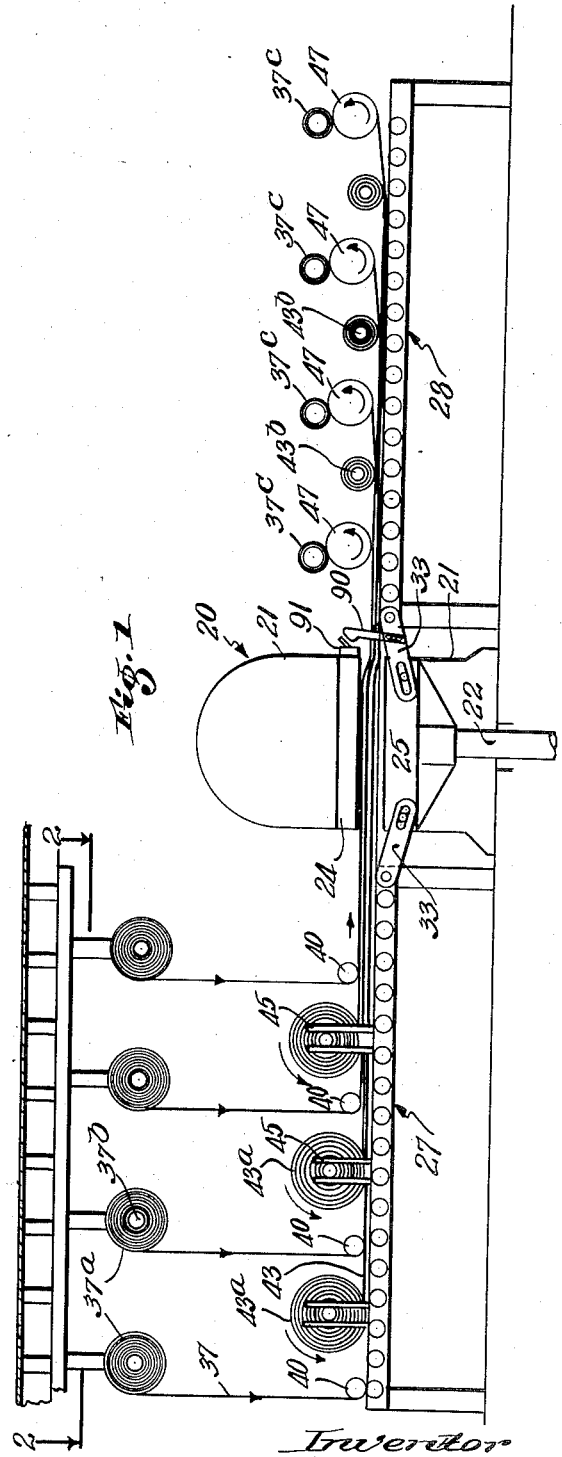
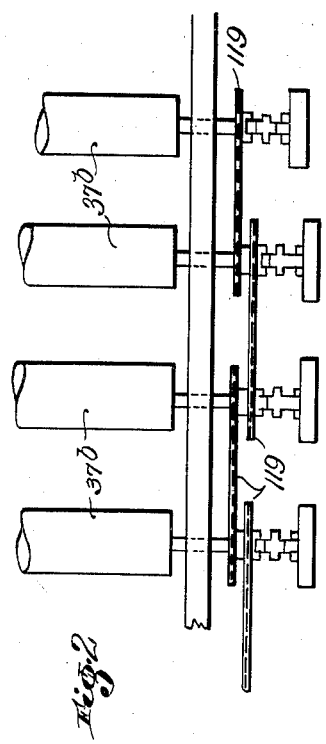

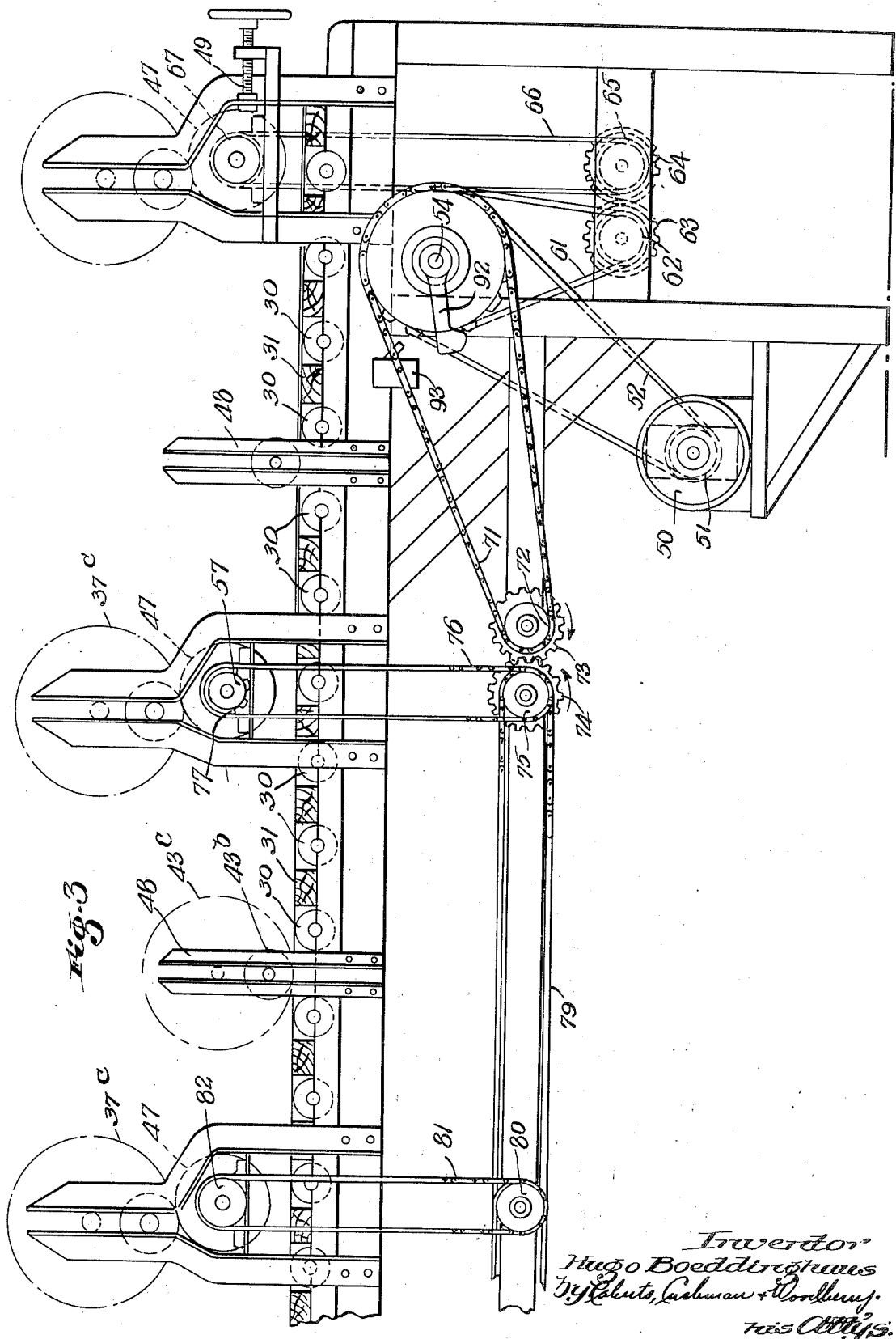

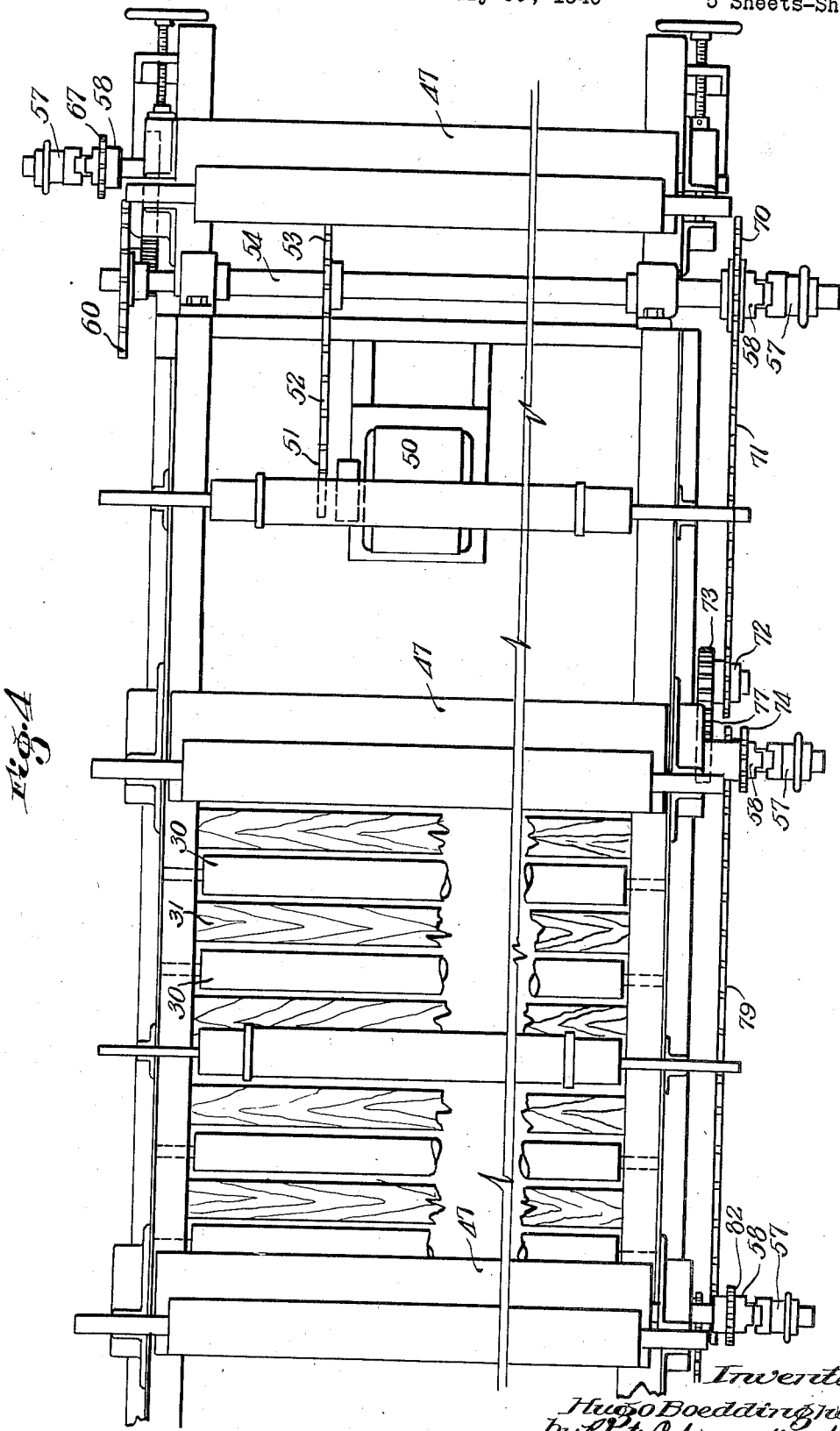

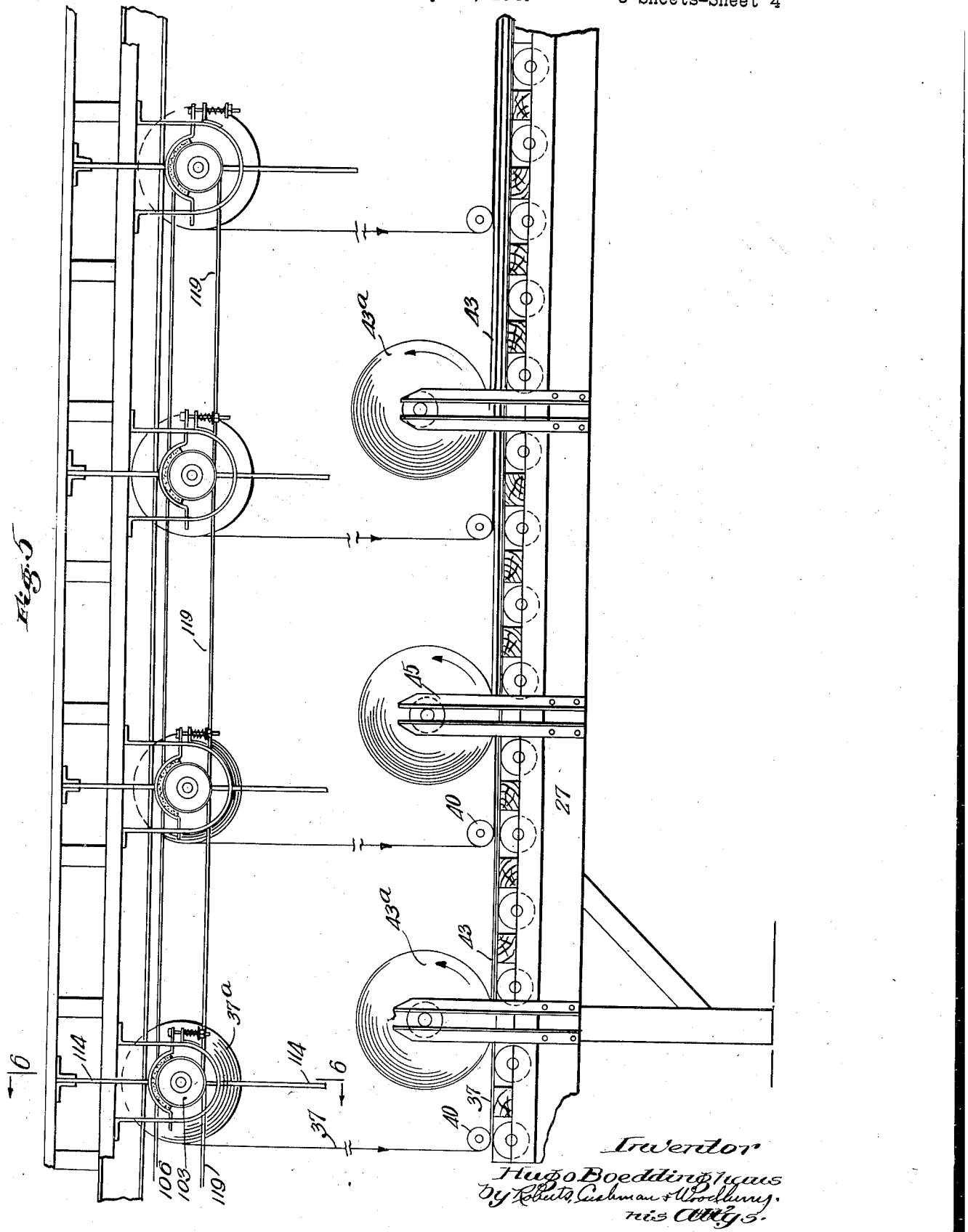

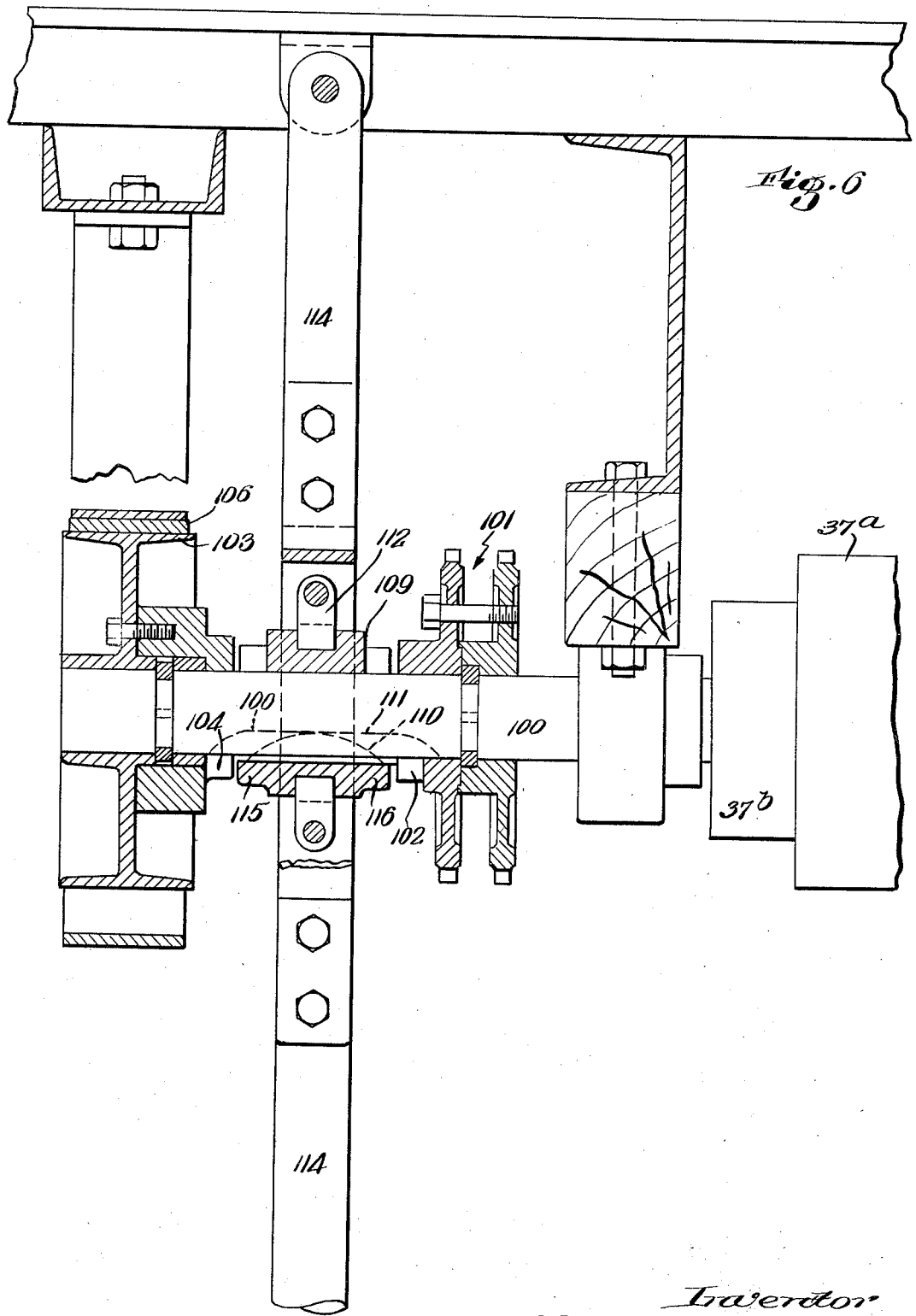

Patented Dec. 12, 1944

2,364,616

UNITED STATES PATENT OFFICE 2,364,616

BONDING SHEET MATERIAL

Hugo Boeddinghaus, Newburgh, N. Y., assignor to American Felt Company, New York, N. Y., a corporation of Massachusetts Application July 30, 1940, Serial No. 348,371

17 Claims. (Cl. 154—1)

This invention relates to an improvement in bonding sheet material and more particularly in its preferred form provides an improved apparatus and process for producing a pressed and thermally bonded material from a sheet or batt which includes thermoplastic fibers. In its preferred form the invention is employed to produce in an expedient and economical manner the product of the applicant's copending application Serial No. 328,768, filed April 9, 1940.

Among the several objects of the invention are to provide an improved press adapted for intermittent action with provision for automatically advancing the material in a step-by-step manner; to provide improved mechanism permitting a plurality of batts with protective aprons therebetween to be pressed simultaneously; to provide improved mechanism for keeping the protective aprons under sufficient tension to avoid slackness therein and consequent imperfections in the product; to provide improved means for causing the batts to be unwound from rolls, conveyed through the press and again rolled up without detriment to the batts either before or after pressing; to provide improved mechanism for expeditiously returning the protective aprons to initial position for the reception of further batts of the material to be pressed; and to provide improved controls for the material-advancing mechanism adapted for automatic or manual operation as desired.

Other objects of invention and features of advantage and utility will be apparent from this specification and its drawings, wherein the invention is explained by way of example.

In the drawings:

Fig. 1 is a diagrammatic side elevation of the press, shown by way of example as equipped to handle simultaneously three batts of material and four protective aprons;

Fig. 2 is a fragmentary diagrammatic sectional view on the line 2—2 of Fig. 1 showing portions of the rolls which hold the protective aprons and portions of their braking and back-winding equipment;

Fig. 3 is a fragmentary side elevation, on a larger scale than Figs. 1 and 2, showing the end of the apparatus at which the pressed material and the protective aprons are separately wound;

Fig. 4 is a plan view of the portion of the apparatus shown in Fig. 3;

Fig. 5 is a fragmentary side elevation, similar to Fig. 3, but showing the opposite end of the apparatus, from which the material and the protective aprons are fed to the press;

Fig. 6 is a vertical sectional view on the line 6—6 of Fig. 5; and

Fig. 7 is a wiring diagram of the electrical controls.

Referring to Fig. 1, the press 20 is diagrammatically shown by way of example as having a stationary head 21 of which the front portion is shown broken away to expose the vertically movable plunger 22. The head 21 and the plunger 22 respectively carry platens 24 and 25 either, or preferably both, of which are suitably heated as by steam or electricity.

Although there is a wide latitude in selecting the characteristics of the press 20, a recommended press suitable for efficient use in producing the product of said application Serial No. 328,768 has platens 24 and 25 having effective flat pressing surfaces of 60 by 84 inches, equipped with steam heating compartments which are capable of maintaining the platen surfaces at approximately 300° F., and with a hydraulically operated plunger 22 capable of imparting a pressure of approximately 1000 pounds per square inch to the material between the platens. It will be understood, of course, that in many instances a lesser pressure, of as low as, for example, five pounds per square inch, may be effectively employed, the particular pressure depending upon the nature of the batt, the nature of the final product and the time and temperature of the pressing. The necessary opening between the fixed and the movable platens of the press depends, of course, upon the combined thickness of the plurality of batts and protective aprons which it is desired to press at one time; a press having a maximum open space of six inches in height will readily receive a number of relatively thin batts and the requisite protective aprons.

While the press, for simplicity, is herein indicated as having flat platen surfaces, one or both of the platen surfaces may be formed as dies for imparting embossed or shaped effects to the product. Also, while only two platens are illustrated, there may be interposed between these two platens one or more other platens between layers of the material to be pressed and protected from adhesion thereto by additional protective aprons.

The general course of the material and protective aprons is indicated by arrows in Fig. 1, that is, from left to right through the press.

In prolongation of the level at which the material is pressed, there are provided on the left and right sides of the press 20 tables 27 and 28, respectively. As shown in Figs. 3, 4 and 5, these tables have their upper surfaces formed largely of rollers 30, which may be mounted in suitable anti-friction bearings, with cross slats 31 in the spaces between the rollers. The supporting surface defined by the rollers 30 provides for easy conveyance of the material and protective aprons to and from the press 20. Preferably, as shown in Fig. 1, there are interposed between the movable lower platen 25 and the tables 27 and 28, connecting leaves 33, pivotally connected to the lower platen and the adjacent table and carrying any suitable cross slats or rollers.

The protective aprons 37, which are preferably of canvas or other suitable textile which is non-adhesive to the material being pressed and to the metal platens of the press at the temperatures of pressing, are initially mainly rolled up in rolls 37ᵃ on mandrels or rollers 37ᵇ which for convenience may be supported from the ceiling at appropriate intervals above the table 27. From these rolls 37ᵃ the aprons 37 are carried down to and around idler rollers 40, thence to the right over the table to the press 20. Referring to Figs. 1 and 5, the batts 43 of material to be pressed are interposed between the protective aprons, so as to present to the press a multiple layer assemblage of for example four protective aprons 37 and three batts 43. If desired, further protection may be afforded by covering the platens of the press with suitable textile material, or by providing additional aprons which need not travel but remain continually interposed between the press platens and the assemblage of material being pressed.

The batts of material to be pressed are preferably the dry carded batt formed as described in said application Serial No. 328,768 by combining several sheets each constituting the product resulting from thoroughly mixing and carding either a mixture of thermoplastic fibers and non-thermoplastic fibers or thermoplastic fibers alone. The desired thickness of such a batt depends upon the nature and thickness of the desired final product. Subjection of these batts to heat and pressure in the press 20 results in bonding the thermoplastic fibers into a permanent network, more or less compressed and compacted in accordance with the pressure, time and temperature of the pressing operation, without, however, causing the batt to become bonded to the contacting aprons.

Rolls 43ᵃ of these batts 43 are mounted on the table by any suitable supports, such as guideways 45, in position for the rolls to be frictionally unrolled by the traction exerted on them by the underlying protective apron. Pulling the protective aprons through the press, as subsequently described, therefore forms the aprons and batts into the desired multiple-layer assemblage for pressing. Fig. 1 diagrammatically shows this assemblage in the press, ready for an upward stroke of the movable platen, and diagrammatically shows that portion of the assemblage which has passed through the press as having a reduced thickness resulting from the pressing.

On the discharge side of the press, over table 28, there are provided winding rolls 47 which are driven in unison intermittently to wind up the protective aprons 37 in rolls 37ᶜ thereon, thus advancing the assemblage of aprons and batts intermittently through the press. Guideways 46, located between the winding rolls 47, are adapted to hold mandrels 43ᵇ on which the respective layers of bonded sheet material are wound up in the form of rolls 43ᵃ, each such roll being frictionally driven by contact with its underlying protective apron.

It will be observed that the apparatus is adapted to unwind the batts of sheet material, convey them through the press in a multiple-layer assemblage, and rewind them separately, all without subjecting the material to any undesirable tension. The tension involved in the conveyance of the material is withstood by the protective aprons, and each of these aprons that underlies a batt of the sheet material supplies the driving force to unwind and subsequently wind the material.

Upon completion of pressing the batts, the batts are removed, and the protective aprons moved back onto rolls 37ᵃ. The winding rolls 47 are therefore provided with clutch mechanisms so that they can rotate freely in the unwinding direction.

Referring to Figs. 3 and 4, the power for driving the several winding rolls 47 is derived from an electric motor 50, which through a sprocket 51, chain 52 and sprocket 53 drives a cross-shaft 54 (Figs. 3 and 4). On the shaft of each roll 47 and also on the end of the cross-shaft 54 there is provided a longitudinally slidable clutch element 57 keyed to the shaft and adapted to engage and disengage with a sprocket-carrying hub 58 which is rotatable on the shaft. Sprockets on the several hubs 58 are connected by suitable chain and gearing connections to the cross-shaft 54. Thus by engaging the several clutch elements 57 with their respective sprocket-carrying hubs 58, all of the winding rollers may be driven, and by disengaging any clutch element the corresponding winding roll 47 may be rendered inactive. Further, by disengaging the clutch element 57 that is located at the end of cross-shaft 54, all but the right-hand winding roll 47 may be rendered inactive.

The chain and gear connections employed to connect the several hubs in the manner described may, for example, comprise the following: To drive the right-hand winding roll 47: A sprocket 60 on cross-shaft 54 (Fig. 4), chain 61 (Fig. 3), sprocket 62, intermeshing gears 63, 64, sprocket 65, chain 66, and sprocket 67 on the sprocket-carrying hub 58 of the right-hand roll 47. To drive the second or next to the right winding roll 47: A sprocket 70 on cross-shaft 54 (Fig. 4), chain 71 (Figs. 3 and 4), sprocket 72, intermeshing gears 73, 74, a double sprocket 75 (Fig. 3), chain 76, and a sprocket 77 on the sprocket-carrying hub 57 of the second roll 47. To drive the third winding roll 47: A chain 79, triple sprocket 80 (Fig. 3), chain 81, and sprocket 82 on the sprocket-carrying hub 58 of the third roll 47. From the triple sprocket 80 the drive is extended by similar chain and sprocket connections to the further similar winding rolls 47 that may be employed.

One end of the right-hand or endmost roll 47 is preferably adjustable by a hand-wheel 48 and screw 49 to permit the aprons to be steered so as to correct any tendency to run off the ends of the rolls 47 in winding.

In preparation for normal operation, in which the assemblage of the batts and protective aprons is conveyed through the press from left to right, the several winding rolls 47 are connected to their driving motor by engaging the several clutch elements 57 with the corresponding sprocket-carrying hubs 58. To permit winding back of the protective aprons 37 onto their rolls 37ᵃ, the several clutch elements 57 are disengaged from the sprocket-carrying hubs.

With the batts and protective aprons threaded through the press, as indicated in Fig. 1, and with the motor 50 stopped, the lower platen 25 of the press is caused to rise, being controlled manually or automatically to apply the desired pressure for the desired period of time, and then lower.

The apparatus includes as one of its advantageous features an automatic mechanism for advancing the material in a step-by-step manner controlled by the operation of the press, so that at each stroke of the press the next portion of material to be pressed advances into the press. Referring to Fig. 1, as the press opens, an arm 90, movable with the movable press platen, trips and momentarily closes a switch 91. Through an electric motor control circuit described below in connection with the wiring diagram of Fig. 7, this circuit starts the electric motor 50, thereby driving the winding rolls 47, and causing the protective aprons and batts to be advanced to the right and wound up.

The gearing by which shaft 54 is connected to the winding rolls is such that during the advance of the material the appropriate distance between pressings, the shaft 54 makes one revolution. A detachable crank arm 92 on shaft 54 trips a switch 93 at the conclusion of such revolution of the shaft. Tripping of the switch 93 has the effect of causing the motor control circuit to stop the motor 50 and thereby stop the advance and winding up of the batts and protective aprons. The press can then be manually or automatically closed again to press the next portion of the material, this sequence being repeated until all of the material of the batts of rolls 43ᵃ has been pressed. Thereupon by manual control of the motor 50, explained in connection with the wiring diagram of Fig. 7, the motor may be run independently of the press to complete the winding up of the pressed batts. The protective aprons 37 should be long enough so as not to be completely unwound from their mandrels 37ᵇ at the conclusion of the winding up of the pressed batts.

The mandrels 37ᵇ from which the protective aprons 37 are unwound during the pressing are equipped with braking means operative during the unwinding so as to apply tension to the aprons and prevent them from becoming wrinkled. Moreover the mandrels 37ᵇ are provided with means for rewinding the aprons so as to prepare the aprons for the reception of a new group of batts after the completion of pressing and winding up of one such group of batts. Preferably the breaking means is ineffective during the rewinding.

Referring to Fig. 6, the shaft 100 of each mandrel 37ᵇ has freely rotatable thereon a double sprocket 101 carrying a clutch element 102, and a brake drum 103 carrying a clutch element 104. A suitable brake-band 106 is mounted in position to act on the brake drum 103.

A hub 109, keyed to the shaft 100 by a key 110 which slides in a keyway 111, is rotatable in a frame 112 which is supported in an outer frame 113. The outer frame 113 forms part of a lever 114, pivotally mounted at its top and extending downwardly to within reach of the operator. The hub 109 carries clutch elements 115 and 116 adapted to interengage respectively with clutch elements 104 and 102. By shifting the lever 114 to the left in Fig. 6, the shaft 100 and mandrel, 37ᵇ are connected with the brake drum 103, for braking of rotation of the mandrel during unwinding. By shifting the lever 114 to the right in Fig. 6, the shaft and mandrel are connected to the double sprocket 101 for driving of the mandrel in the rewinding direction. The double sprockets 101 of the several mandrels are connected to each other and to a suitable driving motor by chains 119 (Fig. 5).

*Motor control circuit*

The motor control circuit can have any desired arrangement adapting it to energize the motor 50 through a period during which the material and aprons are advanced through the press a distance appropriate to bring fresh portions of the material into position for pressing. Ordinarily the advance of the material and aprons each time will be slightly less than the width of the press, to allow for a slight overlap in pressing successive portions.

Preferably, as in the wiring diagram of Fig. 7, the switch 91 is normally open, being momentarily closed by the lowering of the lower press platen, and being relied upon to initiate the starting of the motor 50 through a magnetic starter 120. The switch 93 in the normal stationary position of the winding apparatus is held by the crank arm 92 in its position of Fig. 7, where it of itself is not effective to keep the motor running. However, upon being released by the crank arm 92 when the motor starts, the switch 93 immediately springs to a position opposite to that of Fig. 7, closing a circuit in parallel to that momentarily closed by switch 91 and acting through the magnetic starter 120 to keep the motor running until, upon one revolution of the shaft 54 and crank arm 92, the switch 93 is again brought to its position of Fig. 7. The motor thereupon stops.

The magnetic starter 120 is of the type that supplies current from a pair of terminals 121 and 122 to the controlling switches and keeps the motor 50 energized only when a current derived from these terminals 121 and 122 flows through its magnetic coil 123.

A push-button switch 124 is adapted to connect to one terminal 121 of the magnetic starter either a terminal 125 (for automatic operation) or a terminal 126 (for manual control). When terminal 126 is thus connected, a push-button switch 129 is adapted to energize the starter coil 123, and run the motor 50 as long as switch 129 is held closed. This enables the aprons and material to be run into position for the first stroke of the press, and also after the pressing is finished, enables the winding up of the material to be completed. For this manual operation, the detachable crank arm 92, which actuates switch 93, is removed.

When the push-button switch 124 connects terminal 125 to the starter terminal 121, the control circuit is connected for automatic operation.

With the switch 93 in its position, as shown in Fig. 7, a circuit is established through switch 124, switch 93 and the coil 135 of a magnetic relay 137, closing this relay and thereby closing an alternate circuit through switch 124, relay 137, and relay coil 135, thus keeping the relay closed until either the current fails or switch 124 is turned to its other position. Then, momentary closure of switch 91 by the lowering of the lower press platen energizes the starter coil 123, starting the motor, the switch 93 is caused to move to a position opposite to that of Fig. 7 by rotation of the crank arm 92, and the motor therefore continues to run until one revolution of the crank arm 92 restores switch 93 to its position of Fig. 7, whereupon the motor stops.

If the current supply fails or switch 124 is moved to its position for manual control, relay 137 opens, and thereafter in order to resume automatic operation, it is necessary to close the relay 137 by causing the switch 93 to be in the position of Fig. 7 (i. e. to be engaged by the crank arm 92). Thus, even in the first cycle of automatic operation, exactly one revolution of the crank arm will be made before the motor is stopped. When, after the material has been brought into position (by manual control) for the first press, the detachable crank arm 92 is put back onto shaft 54, the operator so positions it on shaft 54 that it contacts the handle of switch 93, and causes the switch to occupy the position of Fig. 7, thus insuring that the first automatic operation of the motor will produce a full rotation of shaft 54 and the appropriate advance of the aprons and material.

I claim:

1. Method of forming bonded sheet material comprising assembling in layers dry carded batts of fibrous material to be bonded and protective aprons, such aprons being interposed between the batts of material, advancing the assemblage through a press by pulling the aprons along and allowing the tension of conveyance of the assemblage to be applied to the aprons rather than to the said material, subjecting successive portions of the assemblage to heat and pressure in the press to bond the material, and separating the bonded sheet material and the aprons.

2. Method of forming bonded sheet material comprising assembling in layers dry carded batts of material which include thermoplastic fibers and protective aprons comprised essentially of material to which the thermoplastic fibers are not adhesive, such aprons being interposed between the batts of material, advancing the assemblage through a press by pulling the aprons along and allowing the tension of conveyance of the assemblage to be applied to the aprons rather than to the said material, subjecting successive portions of the assemblage to heat and pressure in the press to bond the material, and separating the bonded sheet material and the aprons.

3. Method of forming bonded sheet material comprising assembling in layers dry carded batts of the material to be bonded and protective aprons, such aprons underlying respective layers of the batts, pulling the aprons step by step through a press, thereby advancing the material with the aprons, subjecting successive portions of the material to heat and pressure in the press to bond the material, and separating the bonded sheet material from the aprons by causing the several sheets of bonded material to wind into rolls in frictional contact with and driven by their respective underlying aprons.

4. Apparatus for forming bonded sheet material comprising a plurality of protective aprons, means for assembling sheets of said material in a plurality of layers alternating with said protective aprons, a press adapted to subject successive portions of the assemblage of material to heat and pressure to bond the material, means for pulling the aprons step by step through the press so as to advance the assemblage through the press without substantially tensioning the said material in said assemblage and means for separating the bonded sheet material and the aprons.

5. Apparatus for forming bonded sheet material comprising a protective apron, a press, means for disposing on the protective apron the sheet material to be bonded, means for pulling the apron step by step through the press thereby advancing the sheet material with the apron, and winding means adapted to form the bonded sheet material into a roll in frictional contact with the apron.

6. Apparatus for forming bonded sheet material comprising a plurality of protective aprons, means for assembling sheets of said material in layers with the said aprons underlying the respective layers of the sheet material, a press adapted to subject successive portions of the assemblage to heat and pressure to bond the material, means for pulling the aprons step by step through the press thereby advancing the sheet material with the aprons but without substantially tensioning the sheet material in said assemblage, and means for separating the bonded sheet material from the aprons.

7. Apparatus for forming bonded sheet material comprising a plurality of protective aprons, means for assembling sheets of said material in layers with the said aprons underlying the respective layers of the sheet material, a press adapted to subject successive portions of the assemblage to heat and pressure to bond the material, means for pulling the aprons step by step through the press thereby advancing the sheet material with the aprons, and winding means adapted to cause the sheets of bonded material to wind into rolls in frictional contact with their respectively underlying aprons.

8. Apparatus for forming bonded sheet material comprising a press having platens adapted to open and close to press successive portions of the sheet material, a plurality of aprons adapted to move through the press, means for applying the sheet material to the aprons in advance of the press, mandrels from which the respective aprons are adapted to be unwound in advance of the press, rolls upon which the aprons are adapted to be wound at the discharge side of the press, means for driving said rolls intermittently to wind the aprons and move them forwardly through the press, and means for driving said mandrels in a direction to rewind and pull the aprons back through the press.

9. Apparatus for forming bonded sheet material comprising a press having platens adapted to open and close to press successive portions of the sheet material, a plurality of aprons adapted to move through the press, means for applying the sheet material to the aprons in advance of the press, mandrels from which the respective aprons are adapted to be unwound in advance of the press, means for braking the mandrels to tension the aprons, rolls upon which the aprons are adapted to be wound at the discharge side of the press, means for driving said rolls intermittently to wind the aprons and move them forwardly through the press, and means for driving said mandrels in a direction to rewind and pull the aprons back through the press.

10. Apparatus for forming bonded sheet material comprising a press having platens adapted to open and close to press successive portions of the sheet material, a plurality of aprons adapted to move through the press, means for applying the sheet material to the aprons in advance of the press, mandrels from which the respective aprons are adapted to be unwound in advance of the press, means for braking the mandrels to tension the aprons, rolls upon which the aprons are adapted to be wound at the discharge side of the press, means for driving said rolls intermittently to wind the aprons and move them forwardly through the press, means for driving said mandrels in a direction to rewind and pull the aprons back through the press, and means for rendering the braking means ineffective during the rewinding.

11. Apparatus for forming bonded sheet material comprising a press having platens adapted to open and close to press successive portions of the sheet material, a plurality of aprons, means for applying the sheet material to the aprons in advance of the press, means for guiding the aprons and sheet material in superposed layers to the press, means for advancing said layers of aprons and material in steps through the press, and means for drawing the aprons back through the press.

12. Apparatus for forming bonded sheet material comprising a press having platens adapted to open and close to press successive portions of the sheet material, a plurality of protective aprons, means for applying sheets of the material to said aprons, means for guiding said aprons and material to the press in superposed layers, winding means for the several aprons at the discharge side of the press, means for driving the winding means to advance the material through the press, means controlled by the operation of the press to start said driving means, and means for automatically stopping said driving means after an advance of a fresh portion of the material into the press.

13. Apparatus for forming bonded sheet material comprising a press having platens adapted to open and close to press successive portions of the sheet material, a plurality of protective aprons, means for applying sheets of the material to said aprons, means for guiding said aprons and material to the press in superposed layers, winding means for the aprons at the discharge side of the press, means including an electric motor for driving the winding means to advance the material through the press, and an electric circuit for controlling the motor, including a switch controlled by opening of the platens of the press to energize the motor, and a switch responsive to a predetermined movement of the winding means to deenergize the motor.

14. Apparatus for forming bonded sheet material comprising a press having platens adapted to open and close to press successive portions of the sheet material, a plurality of protective aprons, means for applying sheets of the material to said aprons, means for guiding said aprons and material to the press in superposed layers, winding means for the aprons at the discharge side of the press, means including an electric motor for driving the winding means to advance the material through the press, and an electric circuit for controlling the motor, said circuit including a switch adapted to be closed momentarily by the opening of the platens of the press and adapted to start the motor and a switch controlled by the operation of the winding means for keeping the motor running during a predetermined cycle and then stopping the motor.

15. Apparatus for forming bonded sheet material comprising a press having platens adapted to open and close to press successive portions of the sheet material, a plurality of protective aprons, means for applying sheets of the material to said aprons, means for guiding said aprons and material to the press in superposed layers, winding means for the aprons at the discharge side of the press, means including an electric motor for driving the winding means to advance the material through the press, an electric circuit for controlling the motor, said circuit including a manually operable switch for causing said motor to be energized and automatically actuated switching means for causing the motor to be energized during a predetermined cycle upon the opening of the press platens.

16. Apparatus for forming bonded sheet material comprising a press having platens adapted to open and close to press successive portions of the sheet material, a plurality of aprons, means for applying the sheet material to the aprons in advance of the press, means for guiding the aprons and sheet material in superposed layers to the press, winding means for the several aprons at the discharge side of the press, said winding means acting to advance the layers of aprons and material through the press, means for driving the winding means, means for disconnecting the winding means from its driving means and means for drawing the aprons back through the press.

17. Apparatus for forming bonded sheet material comprising a press having platens adapted to open and close to press successive portions of the sheet material, a plurality of aprons adapted to move through the press, means for applying the sheet material to the aprons in advance of the press, mandrels from which the respective aprons are adapted to be unwound in advance of the press, means for drawing the aprons off from the mandrels and through the press, means for braking the mandrels to tension the aprons during such drawing off, means for driving said mandrels in a direction to rewind pull the aprons back through the press, and means for connecting said mandrels alternatively to said braking and said driving means.

HUGO BOEDDINGHAUS.